Aug. 13, 1968
A. B. MASTERS
3,396,927
LEVELING DEVICE
Filed April 5, 1966
3 Sheets-Sheet 1
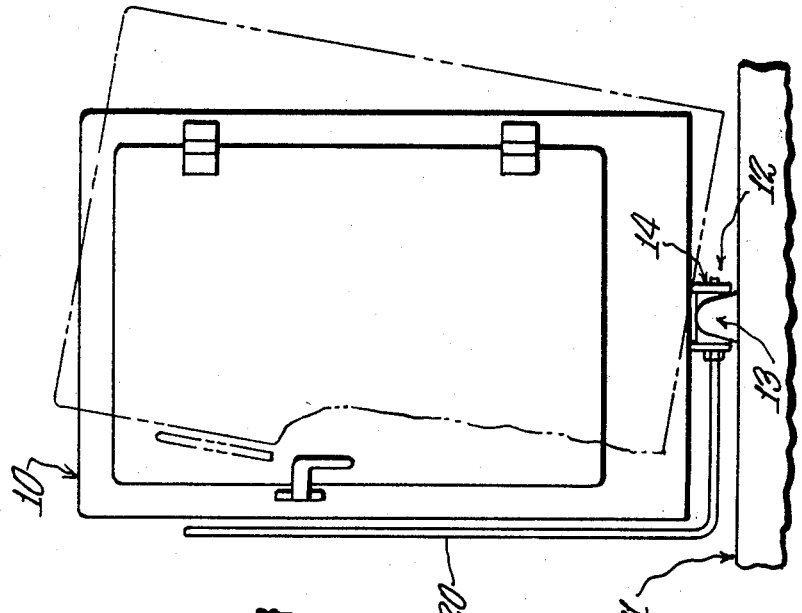
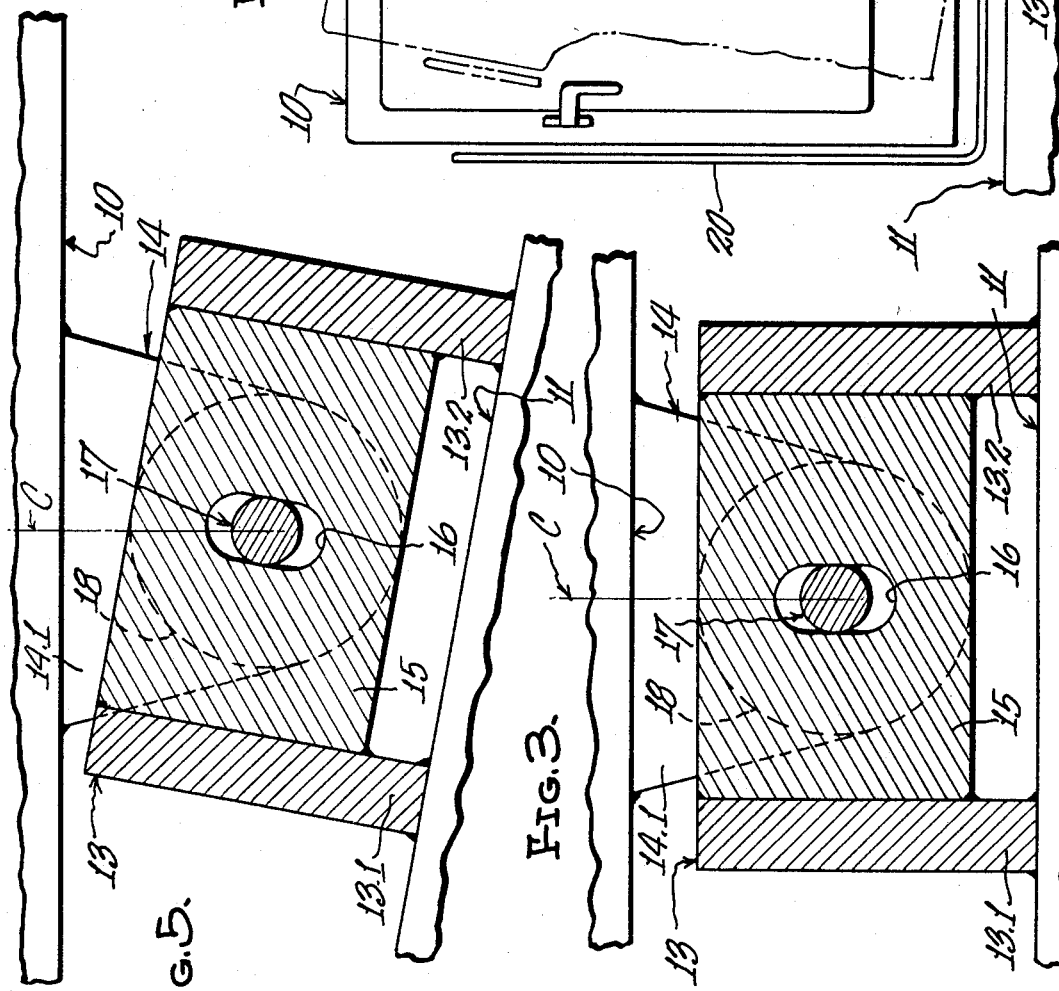
INVENTOR.
Arlo B. Masters
BY
*Williams and Kreaks*
ATTORNEYS

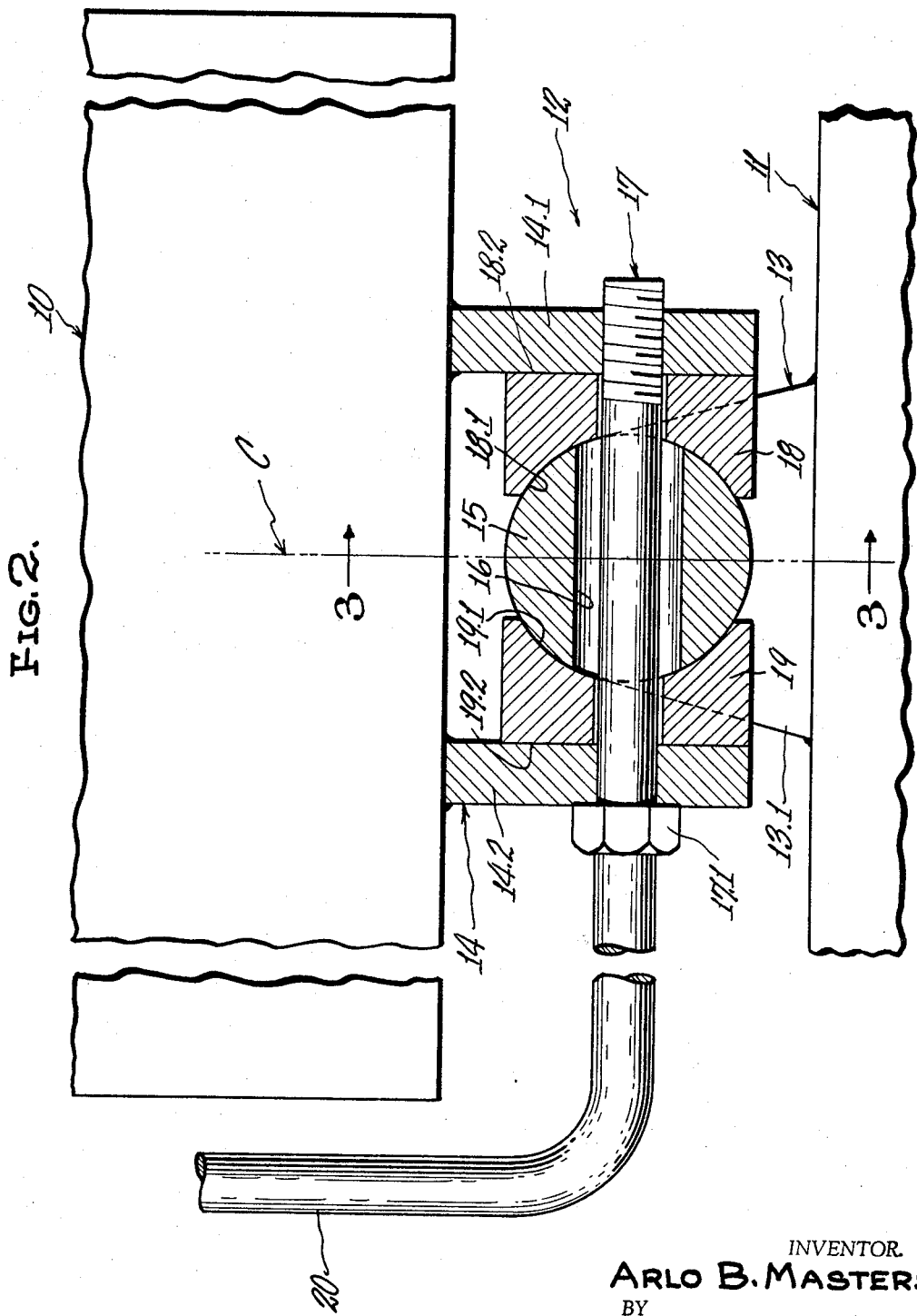

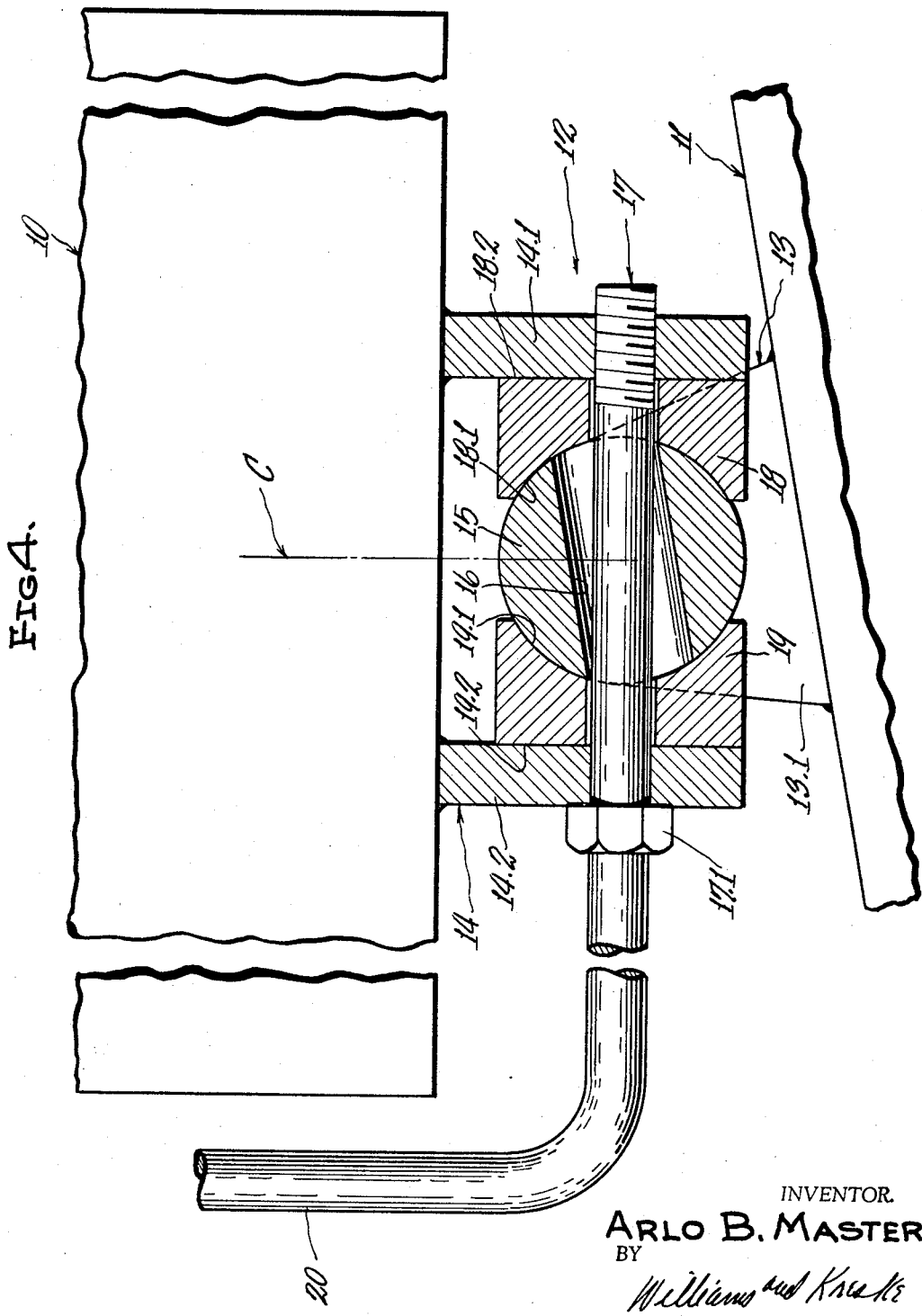

United States Patent Office 3,396,927
Patented Aug. 13, 1968

3,396,927
LEVELING DEVICE
Arlo B. Masters, 5277 Copeland Ave. NW.,
Warren, Ohio 44483
Filed Apr. 5, 1966, Ser. No. 545,198
3 Claims. (Cl. 248—188.2)

ABSTRACT OF THE DISCLOSURE

A device for securing an appliance to a floor whereby the former may be disposed in upright relation despite the floor being tilted from the horizontal. The device is adapted to be interposed between the appliance and the floor and includes means to selectively retain the appliance in selected, adjusted relation with the floor.

---

The present invention relates to leveling devices, more particularly to leveling devices particularly adapted for use in leveling appliances such as ranges and refrigerators in trailers, campers and other land vehicles, and the principal object of the invention is to provide new and improved devices of the character described.

The desirability of having a range reasonably level during use thereof can readily be appreciated. For example, a filled cooking utensil may spill over when supported by the range if the latter is not reasonably level. Additionally, baked goods will assume an undesirable shape if the oven in which they are baked is tilted.

With respect to refrigerators, however, the necessity of having the latter level is more obscure but of even greater importance. For reasons which need not herein be discussed, certain refrigerators will operate satisfactorily so long as the vehicle is in motion; however, if the vehicle is stopped for more than a few minutes, the refrigerator will cease to function unless it is nearly level. This can result in the inconvenience and the possible hazard of food spoilage. Sice it is not always possible to stop the vehicle on level ground, many vehicles and especially trailers have leveling devices associated therewith. Such devices, however, are time-consuming to operate and their use is not practical unless the vehicle is to be parked for a considerable time, such as overnight.

Since it is not always practical to level the vehicle as hereinabove mentioned, an alternative solution is to level the appliance notwithstanding the vehicle being tilted. To this end most appliances, even those for installation in fixed location rather than in vehicles, have leveling devices associated therewith whereby the appliance can be leveled despite a tilted floor. While the usual leveling devices are satisfactory for fixed installations wherein the appliance need only be leveled when first installed, such devices are wholly unsatisfactory when leveling is frequently required since they are too difficult and time-consuming to operate.

Summary

The present invention provides a pair of members adapted to be affixed to the appliance and an underlying floor respectively and each member includes spaced lugs supporting respective pivot axes which intersect each other at ninety degrees and about which the appliance is shiftable. A cylindrical body spans and is supported by one of the pair of lugs and such body is disposed between the other pair of lugs. A pair of spacers are disposed on opposite sides of the cylindrical body and are interposed between the latter and respective lugs of the other lug pair. Such spacers have respective surfaces complementary with the cylindrical body and with respective lugs of the other lug pair and a threaded member extends between the latter lugs and through an aperture in the cylindrical body and through the spacers and is operable to clamp the spacers against the cylindrical body and against respective adjoining lugs to restrict tilting of the appliance about the intersecting axes provided by respective members.

In contrast with conventional appliance leveling devices, the present invention provides an appliance leveling device which requires but a moment to operate and which locks the appliance in position and unlocks the latter for leveling by operation of but a single, easily accessible control. Other advantages will readily become apparent from a study of the following description and from the drawings appended hereto.

In the drawings accompanying this specification and forming a part of this application there is disclosed, for purpose of illustration, an embodiment which the invention may assume, and in these drawings:

FIGURE 1 is an elevational view of an appliance, herein shown to be a refrigerator, secured to a floor by means of a leveling device constructed in accordance with the present invention, FIGURE 2 is an enlarged view, similar to FIGURE 1, but showing the device in vertical section, FIGURE 3 is a sectional view generally corresponding to the line 3—3 of FIGURE 2, FIGURE 4 is a view similar to FIGURE 2 but showing the appliance tilted in one plane, and FIGURE 5 is a view similar to FIGURE 3 but showing the appliance tilted in another plane at right angles to the plane above-mentioned.

With reference to FIGURE 1, there is illustrated an appliance 10 (such as a refrigerator) mounted on a floor 11 by means of a leveling device 12 interposed therebetween Briefly, leveling device 12 comprises a lower support 13 suitably secured to the floor 11 and an upper support 14 suitably secured to the underside of the appliance 10. Although supports 13 and 14 are herein shown to be welded to the floor and to the underside of the appliance respectively, it will be understood that such supports could be bolted or otherwise secured in position. As will later appear, the supports provide respective axes which intersect each other at right angles and about which said supports are relatively shiftable to tilt the appliance, as necessary, for leveling purposes. To facilitate leveling of the appliance and to obviate gravitational forces tending to tilt the appliance once it is properly positioned, it is important that the intersection of the axes aforesaid is centered beneath the center of gravity C of the appliance as seen in FIGURES 2 through 5.

With particular reference to FIGURES 2 and 3, lower support 13 comprises spaced brackets 13.1, 13.2 projecting upwardly from the floor and interconnected by a cylindrical part 15 providing one of the axes aforesaid. For convenience, the brackets and cylindrical part may be welded together from separate pieces; however, it will be evident that such pieces could be bolted or otherwise fastened together or could be cast or machined as a single unit. For a reason to appear, cylindrical part 15 has a transversely extending, vertically elongated aperture 16 whose axis is normal to the axis of part 15.

Upper support 14 is similar to lower support 13 in that it comprises a pair of spaced brackets 14.1, 14.2 which, however, depend from the appliance as shown for disposition on opposite sides of the lower support cylindrical part 15. A tension member, such as a bolt 17, spans the brackets 14.1, 14.2 and passed through the aperture 16 in the part 15. The head 17.1 of the bolt 17 bears against the bracket 14.2, its shank passes through a closely fitted aperture in the bracket 14.2, and its free end is threaded into the bracket 14.1.

Encircling the bolt 17 and respectively interposed between the brackets 14.1, 14.2 are cylindrical shoes 18, 19.

Shoe 18 has a friction surface 18.1 complementary to and engaged with the lower support part 15 and a friction surface 18.2 complementary to and engaged with the bracket 14.1. Similarly, shoe 19 has friction surfaces 19.1, 19.2 complementary to and respectively engaged with part 15 and bracket 14.2. As will appear, the shoe friction surfaces 18.1, 19.1 cooperate with frictional surfaces of the cylindrical lower support part 15 to impede pivotal movement of the upper support 14 and thus the appliance 10 about the axis of the part 15 while the shoe friction surfaces 18.2, 19.2 cooperate with frictional surfaces of the upper support brackets 14.1, 14.2 respectively, to impede pivotal movement of the appliance 10 about the axis of the bolt 17.

With the bolt 17 rotated in a direction to place it under tension, the upper support brackets 14.1, 14.2 will be drawn toward each other to tightly grip the lower support cylindrical part 15 between the clamping shoes 18, 19 and to tightly grip the latter between part 15 and respective upper support brackets. Thus, because of the high frictional forces developed between the friction surfaces aforesaid, the appliance 10 will be retained against tilting relative to the floor 11.

When, however, bolt 17 is rotated slightly in a direction to reduce the tension thereon, the appliance 10 may easily be tilted about the axis of lower support part 15 (as seen in FIGURE 4) and/or about the axis of the bolt 17 (as seen in FIGURE 5) as required for leveling purposes. When the appliance 10 has been leveled, the bolt 17 will once again be tensioned to retain the appliance in its adjusted position. Note that the vertically enlarged aperture 16 provides operating clearance for the bolt 17 as seen in FIGURE 4.

It will be evident that while the appliance 10 as shown tilted in but one plane about the axis of lower support part 15 in FIGURE 4 and tilted in a plane perpendicular to the first-mentioned plane about the axis of bolt 17 in FIGURE 5, the appliance can be tilted in any other plane merely by tilting it appropriately about both axes aforesaid.

Since the bolt 17 underlies the appliance 10 and is thus relatively inaccessible, an L-shaped operating handle 20 may be welded thereto. This handle will preferably be spaced slightly to one side of the appliance and will project upwardly for ease of grasp by a user. It is an important feature of the present structure that the handle 20 tilts with the appliance and thus it is not only easier to operate to lock the appliance in adjusted relation, but it also may be placed unobtrusively quite close to the appliance without the necessity of providing the large amount of clearance which would otherwise be required.

Although not shown, the appliance 10 may carry a suitable level indicating device, such as a bubble level or the like, by means of which the upright or level position of the appliance may readily be ascertained and while the handle 20 is shown welded to the bolt 17, it could easily be made removable, as by forming a socket therein to closely receive the bolt head 17.1.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:
1. In a device for securing an appliance to an underlying supporting surface, the improvement comprising
   first and second members adapted to be affixed to the appliance and the supporting surface respectively, each member including a pair of spaced lugs supporting respective pivot axes which intersect each other at a ninety degree angle and about which said members are relatively shiftable,
   a cylindrical body spanning and being supported by one of said pair of lugs and being disposed between the other of said pair of lugs,
   a pair of spacers disposed on opposite sides of said body and interposed between the latter and respective lugs of said other lug pair,
   and means for clamping said spacers against said body and against respective lugs of said other lug pair to selectively restrict relative shifting movement of said members about respective axes aforesaid.

2. The construction of claim 1 wherein said spacers have respective surfaces complementary with said cylindrical body and with respective lugs of said other lug pair.

3. The construction of claim 2 wherein said clamping means comprises a threaded member extending between the lugs of said other lug pair,
   wherein said threaded member extends through an oversize aperture formed in said cylindrical body,
   and wherein said spacers encircle said threaded member.

References Cited

UNITED STATES PATENTS

| | | | |
|---|---|---|---|
| 2,979,857 | 4/1961 | Longbotham | 248—188.2 |
| 3,071,887 | 1/1963 | Von Arb | 248—188.4 XR |
| 3,186,670 | 6/1965 | Pearl | 248—188.2 |
| 3,235,206 | 2/1966 | Luketa | 248—23 |

JOHN PETO, *Primary Examiner.*